A. Cunningham,
Wheel Plow.
No. 98,569. Patented Jan. 4, 1870.
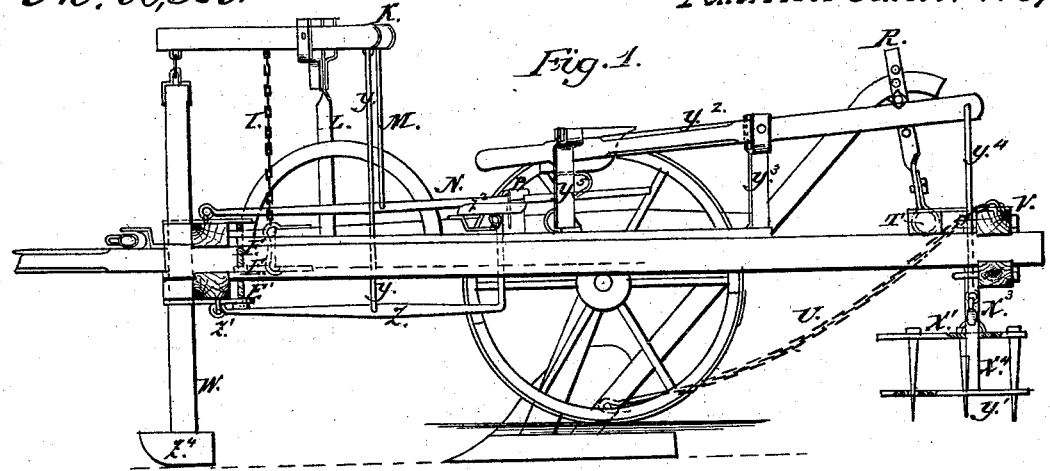
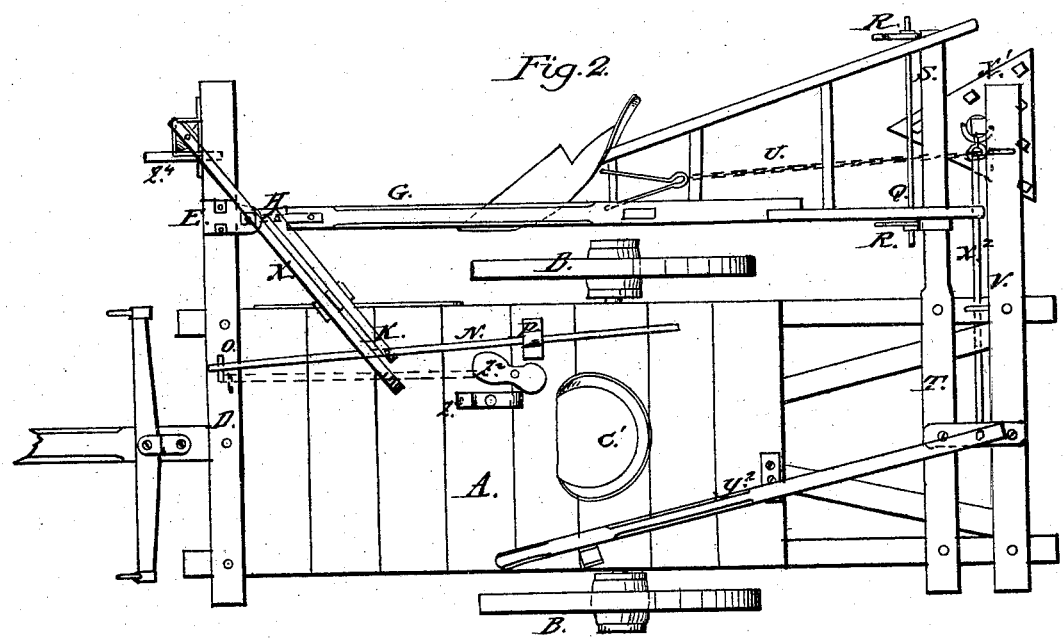

UNITED STATES PATENT OFFICE.

ARTHUR CUNNINGHAM, OF CINCINNATI, OHIO.

IMPROVEMENT IN PLOWING AND HARROWING MACHINES.

Specification forming part of Letters Patent No. 98,569, dated January 4, 1870.

*To all whom it may concern:*

Be it known that I, ARTHUR CUNNINGHAM, of Cincinnati, in the county of Hamilton and State of Ohio, have invented a new and Improved Plowing and Harrowing Machine; and I do hereby declare that the following is a full, clear, and exact description thereof, which will enable others skilled in the art to make and use the same, reference being had to the accompanying drawings, forming part of this specification.

This invention relates to improvements in machines for plowing and harrowing; and it consists in certain peculiar arrangements of connecting and operating devices, whereby a common plow and harrow are connected to a truck adapted for the operator to ride on in a way by which he may govern the plow and harrow as required. The said plow and harrow are adjustably connected to the frame of the truck, so as to vary their action.

Figure 1 is a side elevation of my improved machine, and Fig. 2 is a plan view of the same.

Similar letters of reference indicate corresponding parts.

A is the platform of a truck, mounted on two wheels, B, and provided with a seat, C, for the attendant; also, with a tongue and hitching apparatus for attaching a team. At the front end of this platform is a strong beam, D, projecting from one side, either right or left, as the plow is required to turn; or there may be two beams, one attached to the top and the other to the bottom of the platform. These beams D support a draw-rod, E', in a vertical position in the plates E, projecting rearward from the beams, to which rod the plow-beam G is connected by links H or otherwise, to be drawn thereby. The links H are connected to the draw-rod above a nut or sliding block, F, which may be adjusted up or down thereon, and secured at any point, for varying the height of the links to regulate the depth of cutting. The end of the plow-beam is also connected, by a chain, I, to a lever, K, supported centrally or nearly so on a post, L, and connected by the rod M to the lever N, pivoted to the frame at O, and extending rearward near to the seat, for operation by the attendant while sitting thereon.

P is a hook rising up from the platform for engaging the lever N when pressed down, and holding it there to suspend the plow above the ground when not required to work. This lever also serves to raise it at any time to carry it over obstructions or for other purposes. The rear end of the plow is supported by the handles upon a rod, Q, stretching between and supported by the perforated bars R, attached to the rounded end S of a bar, T, attached to the rear end of the frame, and projecting at the side thereof. These bars are connected to the said rounded part of the bar, so as to be adjusted to or from each other and to oscillate thereon. They rise up against the handles of the plow at the outsides, taking them between and holding them against lateral movement while the rod Q holds them up. This rod may be changed from one set of holes to another, to support the handles higher or lower, or for plow-handles of different heights. The plow is connected at the rear by a chain, U, with another projecting beam, V, so that by backing up the truck the plow can be drawn back to disengage it from roots, large stones, or other obstructions which it cannot overturn. The front projecting beam, D, supports a vertical guide, W, to run in the furrow against the vertical wall thereof or landside, to prevent the plow from running too far to land. This guide is capable of sliding up and down through a suitable guide on the beam D, and the upper end is connected to one end of a lever, X, also supported in the post L. The other end is connected by a rod, Y, to a lever, Z, connected at Z' under the frame of the truck. The other end rises vertically through the platform, and is provided with a foot-rest, $Z^2$, for the operator to press it down to raise the guide out of the furrow when the machine is turned.

$Z^3$ is a button on the platform for engaging with this foot-rest and holding it down when the machine is to be drawn from one field to another or over the road. The guide is provided with a runner, $Z^4$, shaped to prevent catching in the earth.

X' is a harrow suspended from the lever $X^2$ around a post, $X^4$, projecting downward from the beam V by a chain, $X^3$. This post supports a clearing-plate, y', a suitable distance above the ground, through which the harrow-teeth pass, and by which they are cleared of the grass, roots, and other collections by raising the harrow up when required. This is done by the hand-lever $X^2$, supported on the posts $Y^3$, and connected to the lever $X^2$ by the rod $Y^4$.

$Y^5$ is a post near the driver's seat, with a notch in the top, into which the free end of the lever $Y^2$ is placed, to hold the harrow down into working position.

This harrow may be of any preferred construction, and of any size or number of teeth. I prefer, however, to arrange it so that it will work over a space somewhat broader than the furrow.

Having thus described my invention, I claim as new and desire to secure by Letters Patent—

1. The connection of the plow-beam to the truck by means of the projecting beam D and draw-rod E', the latter being provided with the adjustable block F, substantially as specified.

2. The combination, with the plow-beam and platform, of the levers N K, rod M, and chain I, substantially as specified.

3. The combination, with the plow-handles and platform, of the beam T, perforated bars R, and detachable rod Q, when arranged substantially as specified.

4. The combination, with the truck and plow, of the vertically-adjustable guide W, substantially as specified.

5. The combination, with the guide, arranged as described, of the lever K, rod Y, lever Z, and foot-piece $Z^2$, substantially as specified.

6. The combination, with the truck and plow, of the harrow, substantially as specified.

7. The combination of the harrow, suspending-rod $X^4$, clearing-plate Y', lever $Y^2$, rod $Y^4$, and notched post $Y^5$, all arranged substantially as specified.

8. The combination, with the plow and beam V, of the chain U, substantially as specified.

ARTHUR CUNNINGHAM.

Witnesses:
 THOMAS BELL,
 JOSIAH HAIGH.